Patented Jan. 17, 1950                                                                 2,494,931

UNITED STATES PATENT OFFICE 2,494,931

N⁴-ACETYL, N¹-(p-IODOPHENYL) SULFANILAMIDE

Ramon de Montaner, Barcelona, Spain

No Drawing. Application March 9, 1944, Serial
No. 525,780. In Spain March 12, 1943

1 Claim. (Cl. 260—397.7)

The therapeutic importance of the sulfonamide compounds, i. e. the series beginning with sulfanilamide, is well known.

The object of the present invention is the provision of a new group or series of sulfa compounds, characterized by the association with the various sulfamide moieties of iodine, whereby the curative value of the products is increased while toxicity is reduced.

A further object of the invention is the provision of a process which consists essentially in combining a sulfamidic compound, such as p-aminobenzene sulfonamide or any of its halogenated derivatives, e. g. the p-aminobenzene sulfohalide, with iodine or an iodinated compound, it being possible to use advantageously those iodinated derivatives which result from the introduction of iodine into a benzene nucleus, e. g. iodoaniline.

According to the present invention, the iodinated compound to be combined with the sulfamide may also contain an amino group. Use may also be made in this regard of a benzene sulfo-halide which contains in para position a substituent which is convertible into an amino group, together or in admixture with an iodinated compound which contains an amino group.

The iodinated compound, for example iodoaniline, may be prepared as follows:

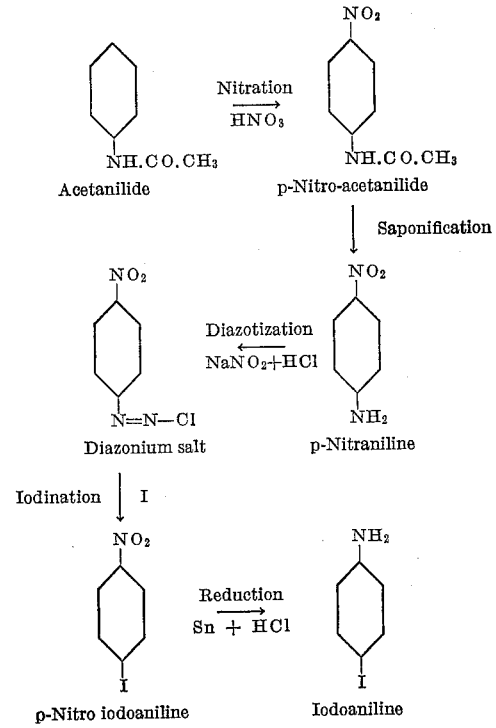

The following illustrative example sets forth in detail a preferred embodiment of the invention, starting from a benzene sulfo-halide:

Equal parts of p-acetylaminobenzene sulfochloride and p-iodoaniline are dissolved in a suitable solvent, the solution being stirred and heated until the reaction is completed. As a result of this reaction, p-acetylamino-benzene sulfonamido iodobenzene is formed, and this is separated by precipitation:

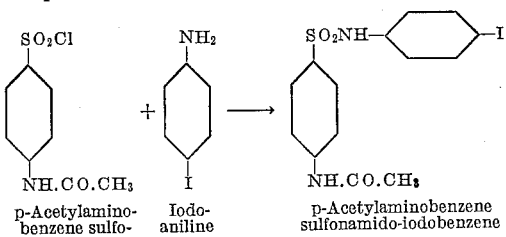

p-Acetylamino-   Iodo-   p-Acetylaminobenzene
benzene sulfo-   aniline   sulfonamido-iodobenzene
chloride This product is saponified by boiling with dilute hydrochloric acid and the resultant products are neutralized with soda, producing the new compound

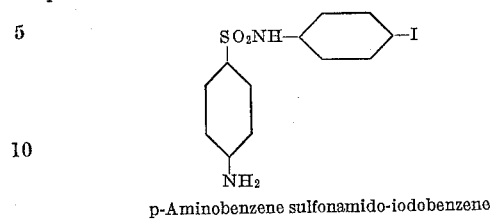

p-Aminobenzene sulfonamido-iodobenzene

Similarly, the sodium salt

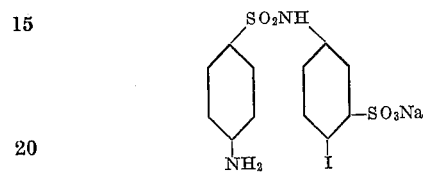

is obtained by the introduction of the —SO₃Na group into the molecule, these compounds being characterized by their notable therapeutic properties, as they are perfectly tolerated by the human organism and have absolutely no poisonous properties.

The foregoing example is wholly exemplary in character and it will be understood that there may be introduced also those variations of detail or execution which do not alter the essential characteristics of the invention.

I claim:
The compound of the formula

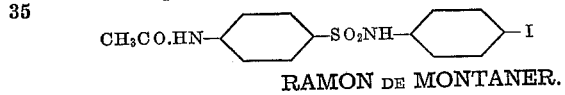

RAMON DE MONTANER.

(References on following page)

REFERENCES CITED

The following references are of record in the file of this patent:

UNITED STATES PATENTS

| Number | Name | Date |
|---|---|---|
| 1,975,160 | Jordan | Oct. 2, 1934 |
| 2,195,067 | Weinand | Mar. 26, 1940 |
| 2,248,911 | Behnisch | July 8, 1941 |
| 2,328,455 | Hultquist | Aug. 31, 1943 |

OTHER REFERENCES

Seudi: Jour. Am. Chem. Soc., vol. 59, pp. 1480–1482 (1937).

Roblin: Jour. Am. Chem. Soc., vol. 62, pp. 1999–2002 (1940).

Chem. Abstracts, vol. 35 (1941), page 2121.

Long et al.: J. Am. Chem. Soc., vol. 63, June 1941, p. 1587.

Northey: "The Sulfonamides and Allied Compounds" (1948), Reinhold Publishing Co., pp. 58, 606, 609.